US011233440B2

(12) United States Patent
Peroutka et al.

(10) Patent No.: US 11,233,440 B2
(45) Date of Patent: Jan. 25, 2022

(54) COMPACT DRIVE UNIT FOR TRACTION VEHICLES

(71) Applicants: ZAPADOCESKA UNIVERZITA V PLZNI, Plzen (CZ); WIKOV MGI A.S., Prague (CZ)

(72) Inventors: Zdenek Peroutka, Plzen (CZ); Miroslav Byrtus, Klatovy (CZ); Karel Hruska, Prestice (CZ); Roman Pechanek, Prague (CZ); Pavel Drabek, Plzen (CZ); Jan Krepela, Dobruska (CZ); Jan Hruska, Police nad Metuji (CZ); Jiri Hana, Velke Porici (CZ)

(73) Assignees: Wikov MGI A.S., Prague (CZ); Zapadoceska Univerzita V Plzni, Plzen (CZ)

( * ) Notice: Subject to any disclaimer, the term of this patent is extended or adjusted under 35 U.S.C. 154(b) by 0 days.

(21) Appl. No.: 16/313,676

(22) PCT Filed: Jun. 29, 2017

(86) PCT No.: PCT/EP2017/066111
§ 371 (c)(1),
(2) Date: Dec. 27, 2018

(87) PCT Pub. No.: WO2018/002210
PCT Pub. Date: Jan. 4, 2018

(65) Prior Publication Data
US 2019/0319512 A1    Oct. 17, 2019

(30) Foreign Application Priority Data

Jul. 1, 2016 (EP) .................................... 16177634

(51) Int. Cl.
*H02K 7/116*    (2006.01)
*H02K 11/33*    (2016.01)
(Continued)

(52) U.S. Cl.
CPC .............. *H02K 7/1163* (2013.01); *B61C 3/00* (2013.01); *B61C 9/52* (2013.01); *B61C 17/08* (2013.01);
(Continued)

(58) Field of Classification Search
CPC ........ H02K 7/1163; H02K 11/33; H02K 7/08; H02K 9/005; B61C 3/00; B61C 9/52;
(Continued)

(56) References Cited

U.S. PATENT DOCUMENTS 1,356,297 A * 10/1920 Lochner ............... B25D 11/102
74/56
1,366,222 A * 1/1921 Viani .................... H02K 21/325
310/70 R
(Continued)

FOREIGN PATENT DOCUMENTS

CN    103633775 B    11/2015
DE    19805679 A1    8/1999
(Continued)

OTHER PUBLICATIONS

Kato et al (JP2003339101A, IDS on Apr. 27, 2020), English translation, printed on Dec. 2020 (Year: 2020).*
(Continued)

*Primary Examiner* — John K Kim
(74) *Attorney, Agent, or Firm* — Hovey Williams LLP

(57) ABSTRACT

A compact drive unit is predominantly intended for traction vehicles, especially for rail vehicles. This invention allows significant reduction of volume and weight of drive units. The drive unit comprises high-speed electrical motor (1) with passive cooling, which is supplied by power electronics converter (2), whose rotor is supported by bearings (3) along with pinion gear (4) of the input spur/helical gear (5). The output shaft (6) of the gear (5) is a part of the next following
(Continued)

gear (7). Output shaft of this gear (7) can be connected either directly or by using the coupling (12) to the axle (8) of the traction vehicle, or to the wheel (9). Alternatively, in case the higher transmission ratio is required, it can be connected to another gears (10), where the output shaft of the gears (10) is connected to the wheel (9), or to the axle (8) of the traction vehicle directly or by using the coupling (12). The drive unit can be equipped with brake (13).

7 Claims, 2 Drawing Sheets

(51) Int. Cl.
| | |
|---|---|
| *H02K 7/08* | (2006.01) |
| *H02K 9/00* | (2006.01) |
| *B61C 3/00* | (2006.01) |
| *B61C 9/52* | (2006.01) |
| *B61C 17/08* | (2006.01) |
| *B61H 9/00* | (2006.01) |
| *F16H 1/20* | (2006.01) |
| *F16H 1/28* | (2006.01) |
| *F16H 7/04* | (2006.01) |
| *F16H 57/04* | (2010.01) |

(52) U.S. Cl.
CPC .............. *B61H 9/006* (2013.01); *F16H 1/203* (2013.01); *F16H 1/28* (2013.01); *F16H 57/0412* (2013.01); *H02K 7/08* (2013.01); *H02K 9/00* (2013.01); *H02K 11/33* (2016.01)

(58) Field of Classification Search
CPC ......... B61C 17/08; B61H 9/006; F16H 1/203; F16H 1/28; F16H 57/0412
USPC .......................................................... 310/52
See application file for complete search history.

(56) References Cited

U.S. PATENT DOCUMENTS

| | | | |
|---|---|---|---|
| 4,130,065 A | 12/1978 | Susdorf et al. | |
| 4,148,262 A | 4/1979 | Eichinger | |
| 5,119,736 A | 6/1992 | Chiodi | |
| 5,751,081 A | 5/1998 | Morikawa | |
| 7,497,286 B2* | 3/2009 | Keller ................... | B60K 17/046 180/65.6 |
| 8,007,390 B2* | 8/2011 | Kato ........................ | B60K 1/00 475/160 |
| 8,978,563 B2 | 3/2015 | Rodet et al. | |
| 9,987,918 B2* | 6/2018 | Haupt ...................... | B60K 6/48 |
| 10,287,964 B2* | 5/2019 | Tokozakura ............. | B60K 1/02 |
| 2008/0223635 A1* | 9/2008 | Noiret ..................... | B60K 6/54 180/65.265 |
| 2009/0318255 A1* | 12/2009 | Kato ................... | F16H 57/0441 475/149 |
| 2014/0265658 A1* | 9/2014 | Sten ......................... | H02K 9/19 310/54 |
| 2015/0202953 A1* | 7/2015 | Iwase ...................... | B60K 6/365 475/5 |
| 2015/0217645 A1* | 8/2015 | Imamura ................. | B60L 11/18 701/22 |
| 2016/0190892 A1* | 6/2016 | Johnson .................. | F16H 55/17 310/89 |
| 2017/0326963 A1* | 11/2017 | Haupt ................... | B60K 17/356 |
| 2019/0154135 A1* | 5/2019 | Graf .......................... | B60L 1/06 |
| 2019/0319512 A1* | 10/2019 | Peroutka .............. | H02K 7/1163 |

FOREIGN PATENT DOCUMENTS

| | | |
|---|---|---|
| DE | 19945464 A1 | 4/2000 |
| DE | 10050757 A1 | 4/2002 |
| DE | 102014117570 A1 | 6/2016 |
| EP | 0054135 A1 | 6/1982 |
| EP | 0428091 A1 | 5/1991 |
| EP | 0457106 A1 | 11/1991 |
| EP | 0698540 A1 | 2/1996 |
| EP | 0918676 A1 | 6/1999 |
| EP | 1386815 A2 | 2/2004 |
| EP | 1867543 | 12/2007 |
| GB | 1438620 A | 6/1976 |
| JP | 2003339101 A | 11/2003 |
| WO | 9629224 A1 | 9/1996 |
| WO | 2006051046 A1 | 5/2006 |

OTHER PUBLICATIONS

Communication from the European Patent Office dated Mar. 7, 2019 in Corresponding Application EP 16 177 634.9 (26 pages).
Demmelmayr, F., et al., "Advantages of PM-machines Compared to Induction Machines in Terms of Efficiency and Sensorless Control in Traction Applications," IECON 2011—37th Annual Conference on IEEE Industrial Electronics Society, Melbourne, VIC, 2011, pp. 2762-2768, doi: 10.1109/IECON.2011.6119749 (7 pages).
Huang, Z., et al., "Design of an interior permanent magnet synchronous traction motor for high speed railway applications," Power Electronics, Machines an drives (PEMD 2012), 6th IET International Conference on, Bristol, 2012, pp. 1-6, doi:10.1049/cp.2012.0253 (6 pages).
Germishuizen, J., et al., "SyntegraTM—next generation traction, drive system, total integration of traction, bogie and braking technology," International Symposium on Power Electronics, Electrical Drives, Automation and Motion, 2006. SPEEDAM 2006, Taormina, 2006, pp. 1073-1077 (5 pages).
International Search Report in Corresponding PCT/EP2017/066111 Completed Sep. 14, 2017 (4 pages).
Written Opinion of the International Searching Authority in Corresponding PCT/EP2017/066111 Completed Sep. 14, 2017 (7 pages).
D.W. Novotny and T.A. Lipo, Vector Control and Dynamics of AC Drives; Clarendon Press, Oxford; pp. 38-77.
I. Boldea and S.A. Nasar; Electric Drives; CRC Press; pp. 295-299.
J. Lemmens, P. Vanassche, and J. Driesen; Optimal Contorl of Traction Motor Drives Under Electrothermal Constraints; IEEE Journal of Emerging and Selected Topics in Power Electronics, vol. 2, No. 2; Jun. 2014; pp. 249-263.

\* cited by examiner

COMPACT DRIVE UNIT FOR TRACTION VEHICLES

RELATED APPLICATIONS

This application is the National Stage of International Patent Application No. PCT/EP2017/066111, filed Jun. 29, 2017, which is hereby incorporated herein by reference in its entirety, and which claims priority to European Patent Application No. 16177634.9, filed Jul. 1, 2016, which is also incorporated herein by reference in its entirety.

TECHNICAL FIELD

This invention concerns a device which is a compact drive unit connected to either a wheel or axle/wheelset of a bogie of a traction vehicle. It is intended especially for drives of rail vehicles such as trams, light rail vehicles, metros, electric units (EMUs) and train sets. The device combines high-speed electric drive with appropriate gearbox and it allows design of drive units with significantly reduced volume and weight.

BACKGROUND AND SUMMARY OF THE INVENTION

This invention introduces a compact traction drive unit intended mainly for rail vehicles, which often demand a full low-floor arrangement of the vehicle. Existing solutions of drive units for traction vehicles can be divided into wheel drives and axle/wheelset drives.

Wheel drives are aimed particularly to low-floor design for urban passenger transport. These drives are used with or without a gearbox, i.e. with a low-speed electric motor directly connected to the wheel. Gearless wheel drives typically employ multi-pole electrical motors connected to the wheel directly or by means of a mechanical coupling element which allows mechanical disconnection of the motor shaft from the wheel (specifically under fault conditions). The electric motor usually uses permanent magnets in order to achieve both maximum power density and efficiency. The above mentioned solutions are known e.g. from EP 1 867 543, EP 0 918 676 and they were reported in many non-patent literature publications, e.g. F. Demmelmayr, M. Troyer and M. Schroedl, "Advantages of PM-machines compared to induction machines in terms of efficiency and sensorless control in traction applications," IECON 2011-37th Annual Conference on IEEE Industrial Electronics Society, Melbourne, VIC, 2011, pp. 2762-2768. doi: 10.1109/IECON.2011.6119749 or Z. Huang, X. Huang, J. Zhang, Y. Fang and Q. Lu, "Design of an interior permanent magnet synchronous traction motor for high speed railway applications," Power Electronics, Machines and Drives (PEMD 2012), 6th IET International Conference on, Bristol, 2012, pp. 1-6. doi: 10.1049/cp.2012.0253.

The gearless wheel drives (such as EP 1 867 543) are competitive in the drives approximately up to 50 kW. In higher power applications, where this invention is intended for, their weights and volumes make impossible direct mounting to the wheel. Their maximum output power is generally limited by wheel diameter and vehicle speed. The same constraint applies to gearless axle drives (such as EP 0 918 676, WO 2006051046 or J. Germishuizen, A. Jockel, T. Hoffmann, M. Teichmann, L. Lowenstein and F. v. Wangelin, "Syntegra™—next generation traction drive system, total integration of traction, bogie and braking technology," International Symposium on Power Electronics, Electrical Drives, Automation and Motion, 2006. SPEEDAM 2006, Taormina, 2006, pp. 1073-1077), where the limit is given by the wheel gauge. One of the biggest disadvantages of mentioned solutions is a direct coupling between the motor and the wheel or axle resulting in large unsprung masses.

Wheelset drives are dominant in applications where higher power transmission to the axle is required, especially for locomotives, EMUs and metro trainsets. These drive units can be designed directly within bogie or vehicle concepts. In WO9629224, the drive unit for a low-floor vehicle is proposed. It drives two wheels by means of a single longitudinally mounted motor outside the bogie. The gearboxes are connected to both output shafts of the motor. The brake is integrated in the drivetrain between the motor and the wheels. Similar solution of one-sided drive for two single wheels is described in DE 199 45 464. In both cases, the motor is proposed as a low-speed one and therefore its weight and dimensions are treated as disadvantages.

The U.S. Pat. No. 5,119,736 describes a bogie concept which is characterized by the longitudinally placed motor of each wheel which is connected to the associated wheel by interposition of a homokinetic flexible coupling shaft and comprises a reduction gear unit. The motor and reduction units do not create a compact closed unit and the presence of the homokinetic coupling shaft signifies that the motor belongs among low-speed ones and therefore its dimensions are large to achieve the rated power of the proposed drive unit.

The U.S. Pat. No. 8,978,563 introduces a bogie drive concept allowing partly low-floor design of the rail vehicle. Longitudinally placed electric motor inside the bogie has output shafts on both motor ends. The shafts are connected by means of a gearbox to axles suspended in the bogie. The concept allows two possible motor designs as well. However, the full low-floor concept is not possible here and the dimensions of the electric motor are larger due to its low-speed concept. The drive does not include the brake directly but it is placed outside the bogie separately.

The concept of a drive driving two axles of the bogie is presented in U.S. Pat. No. 4,130,065, where the electric motor is placed longitudinally outside the bogie between the two drive axles.

The advantage of this design is that the two ends of the rotor shaft stubs are equipped with the drive pinions. To save the weight, the stator of the electric traction motor is made without housing. For this reason, the stator lamination stack clamped between pressure plates is provided at its back with clamping elements which compress the stator lamination stack. Even if the weight is particularly saved, it is not sufficient in comparison to the solution proposed in presented invention, where the high-speed electric motor concept allows significant reduction of the weight of the whole drive unit by using high speeds to transmit desired power.

Among investigated solutions, patents related directly to drive units exist. These patents deal with various connections of the motor to the driven wheel/axle but in general each of presented solutions incorporates a part or design aspect, which makes the usage of a high-speed motor impossible, therefore they lead to physically larger and significantly heavier solutions than presented invention. This fact applies especially to patents DE 100 50 757, EP 1 386 815 and EP 0 698 540.

In case of DE 10050757, the power transmission from the motor to the axle is ensured through cardan-like element and the alignment imperfections between the gearbox and the axle is performed through inclinable tooth coupling. Such a solution is not suitable for higher speeds because of its dimensions and therefore it makes usage of a high-speed electrical motor impossible. The main advantage of presented invention (which is reduction of weight and volume) cannot be achieved through the solution described in DE 100 50 757.

A very similar disadvantage applies to patent EP 0 698 540. In this case, the power transmission from the gearbox to the axle is performed through hollow cardan coupling, which forms a very heavy and large part. In comparison to presented invention, the EP 0 698 540 forms heavier and larger alternative.

The EP 1 386 815 presumes relatively low output power of the electric motor (approximately 40 kW) and utilizes one stage gearbox. The device is applicable to the wheel drive only, whilst our solution is predominantly intended for the axle drive and allows design of higher power drive. The one stage gearbox in EP 1 386 815 does not allow utilization of high-speed electrical motor. The important benefit of our solution is passive cooling system which uses the whole drive unit housing and all integrated components for motor heat dissipation.

Generally, the bearing and gearing lubrication in the traction drive gearboxes, especially of rail vehicles, is performed by means of gear wading in the oil pool and throwing of oil from the wading gears to bearings by auxiliary collecting and distribution channels. Based on available technical data, the maximum speed of the input shaft of the gearbox is nowadays approximately 5 200 rpm. Protective seal of the inner space of the gearbox against dust, water and oil leakage is performed by labyrinth sealing, or by shaft sealing rings.

Cooling of lubricant is performed by means of passive cooling via the housing of the gearbox.

In modern traction drives, the manufacturers use ac electrical motors, most popular are induction and permanent magnet motors which are generally known and they were reported in many non-patent literature publications as described above.

These electrical motors have maximum speeds up to 5 200 rpm (extremely up to 6 000 rpm). They are usually cooled by an independent fan or by a fan placed on the shaft of the motor. The liquid cooling is often used as well.

Existing solutions of traction drive units are designed for lower speeds of electrical motors (approx. up to 5 200 rpm). To assure the transmission of the power from such motor to the axle or wheel, the corresponding design leads from transmitted torque point of view to relatively robust solutions characterized by large volumes of drive units and their considerable weight. The idea of high-speed drive (i.e. with the electrical motor speed over 6 000 rpm), which could enable essential reduction of dimensions and weight of the drive unit, is generally known in the theory. It comes from the equation for mechanical power $P_m = T\omega$, where $P_m$ is a mechanical power at the rotor output, T is a torque and $\omega$ is a mechanical rotor speed. Therefore, if the rotor speed is significantly increased and the output power is kept constant, then the output torque substantially decreases. Thus, all mechanical components result smaller in volume and weight. However, there is no existing reliable design solution available for traction applications up to now. This invention describes a robust design solution of the compact drive unit, which allows significant reduction of the volume and the weight of the traction unit due to significant increase of the traction motor speed (typically over 9 000 rpm) while keeping the same traction vehicle characteristics. Although, higher speeds of traction motor require usage of high-speed stages of the gearbox to reduce the speed to rated output speeds of the axle/wheel, the torques transmitted by high-speed stages of the gearbox are significantly lower, which principally decreases demands on gear train dimensions. Moreover, the proposed compact unit, due to significant reduction of dimensions of particular parts of the drive, enables the integration of the drive into a single compact housing. This integration into the one housing together with unique construction design of high-speed electrical motor makes possible to improve the heat transfer from particular components and to use passive cooling of the electrical motor, which is a significant advantage compared to the existing solutions. As explained above, the proposed invention significantly overcomes currently known designs and arrangements of drives for traction vehicles. It allows significant reduction of weight and volume of the drive unit and, based on that, integration of the drive unit into the single compact housing, which further enables the use of passively cooled electrical motor and significantly simplifies and reduces the cost of drive assembling.

The proposed solution requires preheating of the lubricant of high-speed stage of the gearbox during extremely low ambient temperatures, which can typically go down to −40° C. This is, as described in detail below, solved by design arrangement of the drive and by the usage of thermal sources available in the integrated body of the drive unit, i.e. without any further external equipment. In comparison with existing designs of traction drives employing low-speed gearboxes having no extreme demands on gearing and bearing lubrication or pre-heating of lubricant, the required preheating in this invention is not any significant disadvantage.

BRIEF DESCRIPTION OF DRAWINGS

The invention is further explained by means of the drawings.

DESCRIPTION OF THE PREFERRED EMBODIMENTS

Figure 1:
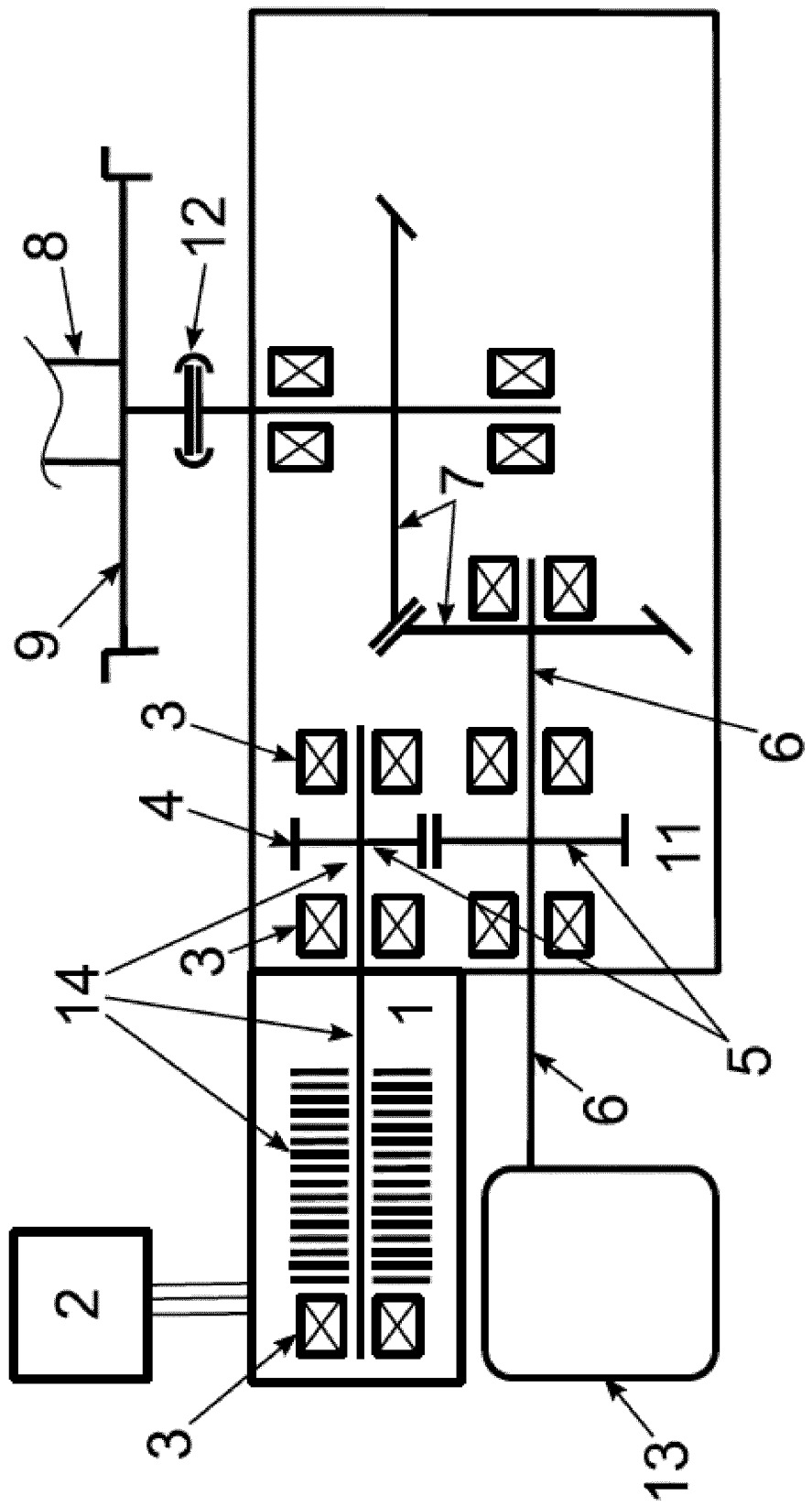
FIG. 1 describes basic configuration and cooperation of particular components of invented compact traction drive unit.

FIG. 1 describes invented compact traction drive unit. The device is composed of a high-speed electrical motor 1 with passive cooling. The motor 1 has typically rated rotor speed over 9 000 rpm. The high-speed electrical motor 1 can be designed as an induction motor, a synchronous motor, a reluctance motor, an electronically commutated (brush-less dc) motor or a direct-current motor. Considering requirements for extremely small volume, high efficiency and reliability, the permanent magnet motor is going to be the most suitable solution.

The electrical motor 1 is supplied by a power electronics converter 2. Typically, it is a voltage-source inverter. The power electronics converter 2 can also be a current-source inverter.

Figure 2:
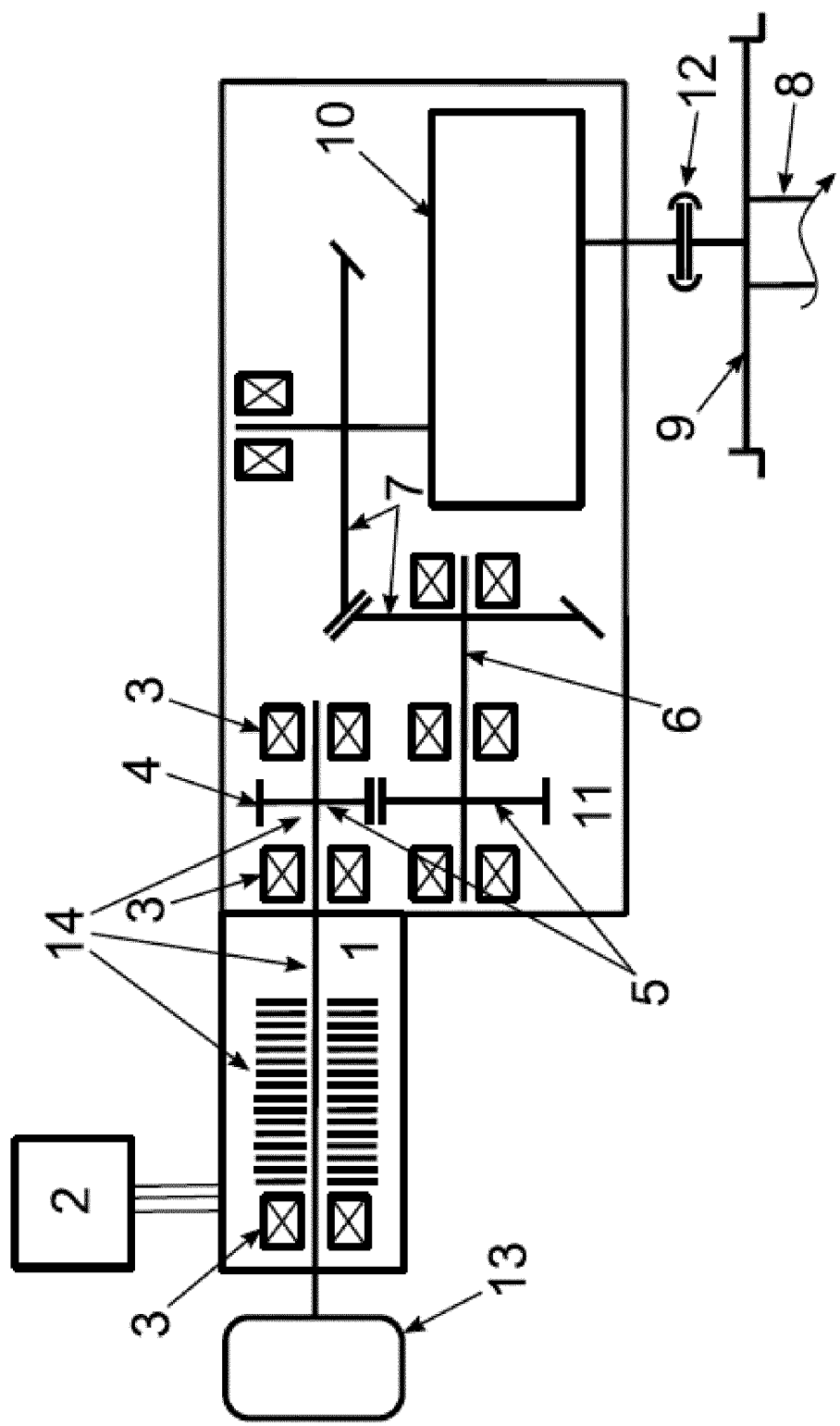
FIG. 2 describes the functionality of optional additional gearbox stages and alternative position of the brake.

From the FIG. 1 it is apparent that a gearbox connected at the drive-end of the motor shaft is divided into two stages: high-speed gearbox stage 11, and low-speed gearbox stage. The high-speed gearbox stage 11 includes an input spur/helical gearset that defines a set of pinion gear 4 and spur/helical gear 5. The low-speed gearbox stage includes a following bevel gearset that defines a set of bevel gears 7. The rotor of the electrical motor 1 is supported by three rolling-element bearings 3 along with pinion gear 4 of the input spur/helical gear 5 and all together create rotor assembly 14. The location of the middle rolling-element bearing 3 at the motor shaft improves the dynamic stability of the rotor. It also simplifies drive unit assembly. The shaft 6 of the high-speed gearbox stage 11 is a part of the following bevel gear 7 and simultaneously it can be connected to the brake 13. The coupling of the brake 13 to the shaft 6 of the high-speed gearbox stage 11 allows important reduction of the dimensions of the brake 13. Alternatively (as shown in FIG. 2), the brake 13 can be connected to the rotor assembly 14 which will further reduce the brake dimensions.

Output shaft of the bevel gear 7 can be connected either directly or by using the coupling 12 to the axle 8 of the traction vehicle, or to the wheel 9. In case the higher transmission ratio is required, the output shaft of the bevel gear 7 can be connected to additional gears 10 (as shown in FIG. 2), where the output shaft of these additional gears 10 is connected to the wheel 9, or to the axle 8 of the traction vehicle directly or by using the coupling 12. The brake 13 can also be connected to the output of the low-speed gearbox stage. However, this position leads to the larger dimensions and weight of the invented compact traction drive unit.

Due to significant reduction of both dimensions and weight of particular components of invented drive unit, all the drive unit components can be embedded into one compact housing. This solution significantly decreases the assembly cost and time. However, it is important that at least electrical motor 1 and high-speed gearbox stage 11 are embedded into common compact housing. The integration of the drive unit components into the single housing together with unique construction design of the high-speed motor 1 result in better heat dissipation from all components and it allows a passive cooling of the electrical motor 1 and the whole drive unit. This is very important advantage of the presented invention in comparison to existing traction drive technologies.

The proposed two-stage solution of the gearbox requires preheating of the lubricant of the high-speed gearbox stage 11 under extremely low ambient temperatures (typically down to −40° C.) before running the gearbox. Due to integration of the drive unit components into one housing, the proposed invention uses preheating of the lubricant of the gearbox 11 by means of the losses of the electrical motor 1. Thus, the power electronics converter 2 feeds the current into the stator winding of the motor 1 which causes production of the heat due to existing losses in the motor 1 (the resistive losses play the major role in this phenomenon). The produced losses, respectively resulting heat is distributed inside the drive unit using the conduction via both drive components and the housing and it preheats in this way the lubricant of the gearbox 11 before its running. Thus, the invented concept does not require any additional device (external thermal source, etc.) and it is very robust and reliable.

This invention allows significant reduction of drive units volume and weight while demanded traction power/tractive effort is kept. If the electrical motor 1 has the rated speed around 9 000 rpm and the rated power close to 100 kW (typical application for light traction vehicles), our conservative calculation shows that the drive unit volume and weight will decrease at least by 25% while keeping the same traction vehicle characteristics. This invention allows manufacturing of the traction drive unit in a single compact housing. It results in better heat dissipation from the drive components, it is not necessary to use a fan for the drive cooling (passive cooling of the whole drive forms the important advantage in comparison to competitive solutions) and the single drive housing also cuts the assembly cost and time.

The invention claimed is:

1. A traction rail vehicles compact drive unit for mounting on outside of a wheel of a traction rail vehicle, the traction rail vehicles compact drive unit comprising an electrical motor supplied with voltage or current from a power electronics converter, a gearbox divided into a high-speed gearbox stage and a low-speed gearbox stage, and a mechanical coupling to a wheelset or the wheel, wherein the high-speed gearbox stage includes an input spur/helical gearset that defines a set of pinion gear and spur/helical gear, wherein the electrical motor is a high-speed electrical motor with a speed over 9000 rpm, its rotor is supported by bearings along with the pinion gear of the input spur/helical gearset of the high-speed gearbox stage and all together create a rotor assembly having an axis of rotation that is perpendicular to the axis of rotation of the wheel, wherein the low-speed gearbox stage includes a following bevel gearset that defines a set of bevel gears, wherein an output shaft of the spur/helical gearset of the high-speed gearbox stage is a part of the following bevel gearset of the low-speed gearbox stage, an output shaft of the bevel gearset of the low-speed gearbox stage is connectable either directly or by using the coupling to an axle of the traction vehicle, or to the wheel, wherein at least the electrical motor and the high-speed gearbox stage are embedded in a single compact housing, wherein the power electronics converter is arranged to feed current into a stator winding of the electrical motor which causes production of heat due to existing losses in the electrical motor, wherein the heat is distributed inside the drive unit using conduction via both drive components and the housing for preheating of a lubricant of the high-speed gearbox stage before motor rotation and running the gearbox under extremely low ambient temperatures.

2. The traction rails vehicles compact drive unit according to claim 1 wherein the electrical motor is with passive cooling.

3. The traction rails vehicles compact drive unit according to claim 1 wherein the rotor assembly is supported by at least three bearings.

4. The traction rails vehicles compact drive unit according to claim 1 wherein the output shaft of the high-speed gearbox stage is connected to a brake.

5. The traction rails vehicles compact drive unit according to claim 1 wherein the rotor assembly is connected to a brake.

6. The traction rails vehicles compact drive unit according to claim 1 wherein the output shaft of the low-speed gearbox stage is connected to a brake.

7. The traction rail vehicles compact drive unit according to claim 1, wherein the output shaft of the bevel gearset of the low-speed gearbox stage is connected to the wheelset or the wheel of the traction vehicle via additional gears.

* * * * *

UNITED STATES PATENT AND TRADEMARK OFFICE
CERTIFICATE OF CORRECTION

| | |
|---|---|
| PATENT NO. | : 11,233,440 B2 |
| APPLICATION NO. | : 16/313676 |
| DATED | : January 25, 2022 |
| INVENTOR(S) | : Zdenek Peroutka et al. |

It is certified that error appears in the above-identified patent and that said Letters Patent is hereby corrected as shown below:

On the Title Page

Item (71) one of the applicants is incorrectly listed as "ZAPADOCESKA UNIVERZITA V PLZNI, Ptzen (CZ)" and should appear as -- ZAPADOCESKA UNIVERZITA V PLZNI, Plzen (CZ) --.

In the Claims

Column 6, Lines 44, 47, 50, 53, and 56 (associated with Claims 2-6), instances of "The traction rails vehicles" should appear as -- The traction rail vehicles --.

Signed and Sealed this
Twenty-sixth Day of April, 2022

Katherine Kelly Vidal
*Director of the United States Patent and Trademark Office*